United States Patent [19]

Morihara

[11] Patent Number: 4,817,019
[45] Date of Patent: Mar. 28, 1989

[54] INSPECTING APPARATUS FOR MEASURING SENSORS MOUNTED ON TRAIN

[75] Inventor: Kenji Morihara, Amagasaki, Japan

[73] Assignee: Mitsubishi Denki Kabushiki Kaisha, Tokyo, Japan

[21] Appl. No.: 203,506

[22] Filed: Jun. 6, 1988

Related U.S. Application Data

[63] Continuation of Ser. No. 903,285, Sep. 3, 1986, abandoned.

[30] Foreign Application Priority Data

Sep. 30, 1985 [JP] Japan .................. 60-215111

[51] Int. Cl.$^4$ ............................ G06F 11/00
[52] U.S. Cl. .................. 364/550; 364/424.04
[58] Field of Search .......... 364/436, 424, 550, 426; 246/182 R, 187 R

[56] References Cited

U.S. PATENT DOCUMENTS

| | | | |
|---|---|---|---|
| 4,041,470 | 8/1978 | Slane et al. | 364/900 |
| 4,042,810 | 8/1977 | Mosher | 364/424 |
| 4,561,057 | 12/1985 | Haley, Jr. et al. | 364/550 R |
| 4,582,280 | 4/1986 | Nichols et al. | 246/182 R |
| 4,618,954 | 10/1986 | Otobe et al. | 371/15 |
| 4,774,669 | 9/1988 | Schmitz et al. | 364/436 |

OTHER PUBLICATIONS

53 Mitsubishi Electric Technical Review 695-99 (1979).
Nakatsuka et al., *Process Computer Application to Train Test Automation*, 43 Mitsubishi Electric Technical Review 1504-10, (1969).

*Primary Examiner*—Parshotam S. Lall
*Assistant Examiner*—Thomas G. Black
*Attorney, Agent, or Firm*—Burns, Doane, Swecker & Mathis

[57] ABSTRACT

The inspecting apparatus for measuring sensors mounted on a train of this invention comprises a transmission center having a memory and data output unit being installed, for example, in the first car of a train, and individual transmission terminals to fetch the data from measuring sensors being installed in all cars including the first one. The measured data from each measuring sensor is fetched from each transmission terminal into the transmission center, stored into the memory, and processed by comparing with the initial value and the like, and the result of such processing is provided into the data output unit. Accordingly, since inspection in the same conditions as real operation is possible, without dismounting the measuring sensors from the train, the monitoring of a train can be continuously carried out.

7 Claims, 3 Drawing Sheets

INSPECTING APPARATUS FOR MEASURING SENSORS MOUNTED ON TRAIN

This application is a continuation of application Ser. No. 903,285, filed Sept. 3, 1986, now abandoned.

BACKGROUND OF THE INVENTION

1. Field of the Invention

This invention relates to an inspecting apparatus for measuring sensors mounted on a train which enables one to inspect measuring sensors installed at various positions in a train, such as the measuring sensor for air pressure and the like applied to the brake cylinder, without dismounting them from the train.

2. Description of the Prior Art

As the inspecting apparatus for measuring sensors, such as the sensor for measuring the brake cylinder pressure of a train and the one for measuring the bearing temperature of wheels, the following two organizations are conventionally known.

In the first organization, the train is set in an inactive state in the maintenance shop or shed, and an equivalent input (for example, if the object of inspection is the air pressure sensor, the air pressure generated by a compressor) is applied to the measuring sensor from outside, whereby the sensor is evaluated according to its output. This method is disclosed, for example, in Vol. 53, No. 9 of Mitsubishi Electric Technical Review, on pages 695 to 699 published in 1979.

Referring to the inspection of measuring sensor of brake cylinder pressure installed in the air brake control system of a train, an example of strain gauge is explained below though other methods are known as this kind of pressure sensor such as the method of combining plural air pressure switches and detecting by dividing the pressure into several ranges.

First, when the train to be inspected is in inactive state for periodic inspection or extraordinary inspection, the pressure sensor is dismounted from the train at the maintenance shop or shed, and is mounted on a specified inspection apparatus, and an equivalent air pressure is applied to the measuring sensor from an external compressor to measure. On the other hand, the equivalent air pressure applied to the sensor is measured by a proper standard instrument, such as Bourdon tube. Then by comparing the measured results of the measuring sensor and standard instrument, the measuring sensor dismounted from the train is evaluated.

The second organization relates to a method of inspecting the sensor without dismounting it from the train, for example, as disclosed in Vol. 43, No. 11 of Mitsubishi Electric Technical Review, on pages 1504 to 1510 published in 1969.

When inspecting the pressure sensor of Brake cylinder installed in the air brake control system in a train by this method, an equivalent air pressure is supplied to this brake control system from outside, while a proper standard instrument, such as Bourdon Tube, is attached to the same air brake control system. Then by comparing the results measured by the measuring sensor to be inspected and the standard instrument, the measuring sensor is evaluated.

As the conventional inspecting apparatus for measuring sensor mounted on a train is thus organized, various problems are involved.

In the first method, when the measuring sensor to be inspected is dismounted from the train, the peripheral devices and parts must also be removed, and they must be reassembled when the sensor is remounted onto the train. It means there is a risk of misalignment in remounting and assembling the parts as well as in adjusting peripheral devices. Specifically, when inspecting the brake cylinder pressure sensor of air brake control system as described in the above example, air may escape through the piping, or dust may invade into the piping. Furthermore, the measuring sensor to be inspected itself may be injured or deviated in adjustment.

Besides, as the problem common to both methods, the inspection requires external devices for feeding equivalent outputs into to the measuring sensor to be inspected, such as an air compressor, and the devices for receiving the outputs of the measuring sensor to be inspected, such as a voltmeter, and also standard measuring means as a means of comparison. Therefore, it is possible to inspect only in particular maintenance shop or shed fully equipped with those devices, and it is hard to improve the efficiency of inspection, and it is also difficult to shorten the downtime of the train.

SUMMARY OF THE INVENTION

This invention is intended to overcome the above-discussed background, and its primary object is to provide an inspecting apparatus that can inspect the measuring sensor mounted on a train in an ordinary mounted state without dismounting it, or in an ordinary working state, that is, even while the train is running.

It is another object of this invention to provide an inspecting apparatus that can inspect the measuring sensor mounted on a train without requiring any large stationary ground facilities, and without any loss time for dismounting the measuring sensor to be inspected from the train and putting it back, thereby enabling to shorten the downtime of the train.

The inspecting apparatus for measuring sensors mounted on a train of this invention comprises a transmission center having a memory in the first car of the train and a data output unit, and also comprises transmission terminals installed in all cars including the first one to receive data from the measuring sensors, wherein the measured data by the measuring sensors are collected into the transmission center from the individual transmission terminal, stored in the memory, and compared with the initial value, and then provided into the data output unit.

The above and further objects and features of the invention will more fully be apparent from the following detailed description with accompanying drawings.

DESCRIPTION OF THE PREFERRED EMBODIMENTS

Figure 1:
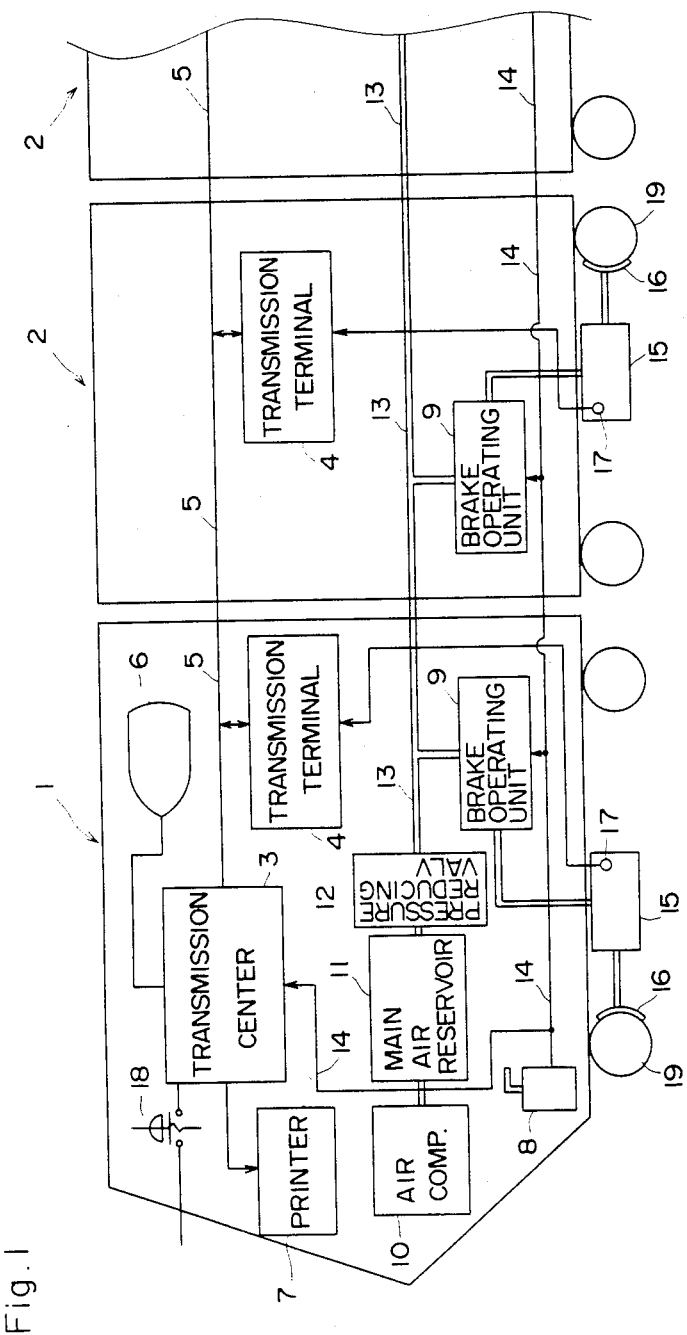
FIG. 1 is a block diagram showing the constitution of an inspecting apparatus for measuring sensor mounted on a train of this invention.

The inspecting apparatus for measuring sensor mounted on a train of this invention is described below while referring to the drawings showing one of its embodiments.

FIG. 1 is a block diagram showing the outline of an embodiment of an inspecting apparatus for measuring sensor mounted on a train of this invention.

In the diagram, numeral 1 designates the first car of a train which is composed of several cars, and 2 designates an intermediate cars coupled between the first car 1 and the last one.

The first car 1 is provided with a transmission center 3 and CRT display 6 and printer (or plotter) 7 as the data output units thereof.

The transmission center 3 is mainly composed of a micro computer system, comprising memory, interface, keyboard and other, and having specified data processing functions as described below, it provides various information, including the data processing results, to the data output units, that is, the CRT display 6 and printer 7. In this embodiment, the transmission center 3 is installed in the first car 1, but it is not so limited, and it may be installed in any one of the intermediate cars 2 where the conductor's room is located.

Furthermore, transmission terminals 4 are installed in all cars 1 and 2 including the first car 1 where the transmission center 3 is installed. Moreover, a serial data transmission line 5 whose one end is connected to the transmission center 3 is passed through all cars 1 and 2, the transmission terminals 4 of the cars 1 and 2 being connected to this serial data transmission line 5.

To each transmission terminal 4 is connected a measuring sensor installed at proper position of the cars 1 and 2, such as a pressure sensor 17 installed in the brake cylinder 15 of air brake unit mentioned below. Each transmission terminal 4 processes the data as specified with respect to the measured value of each measuring sensor (in this embodiment, the pressure sensor 17 in the brake cylinder 15), and transmits the result to the transmission center 3 through the serial data transmission line 5.

In the diagram, numerals 6 and 7 are CRT display and printer, as mentioned above, as the data output units. That is, various items of data being controlled by the transmission center 3, sent from each transmission terminal to the transmission center 3 and collected, and the data processing results of these items of data by the transmission center 3 are displayed or printed out, as required, in the form of character string, graph, or table.

Numeral 8 in the diagram is the brake command unit installed in the driver's cab in the first car 1, and the brake command to the entire train is delivered through the command line 14 in the form of electric signal. The brake command signal delivered from this brake command unit 8 is applied to the transmission center 3 and the brake operating units 9 installed in individual cars 1 and 2.

The individual cars 1 and 2 are equipped with the brake operating units 9 as mentioned above and brake cylinders 15 of which air pipings are connected to the brake operating unit 9. To each brake operating unit 9, the compressed air generated by an air compressor 10 installed in the first car 1 is supplied by way of main air reservoir 11 and pressure reducing valve 12 through brake valve 13. In consequence, each brake operating unit 9 supplied the required pressure portion of the compressed air applied from the brake pipe 13 to the brake cylinder 15, corresponding to the brake command signal provided from the brake command unit 8.

A brake shoe 16 is attached to the piston of brake cylinder 15, and when compressed air is supplied into the brake cylinder 15, the piston goes out until the brake shoe 16 abuts against the tread (or the disk fitted to the axle) of the wheel 19 of each car. As a result, a mechanical braking force corresponding to the pressure of the compressed air supplied to the brake cylinder 15 is put in effect.

At a proper position in each brake cylinder 15, a pressure sensor 17 making use of, for example, strain gauge is installed. Therefore, when a brake command signal is delivered from the brake command unit 8 and compressed air is supplied into the brake cylinder 15, this pressure is measured by the pressure sensor 17. Since the output of this pressure sensor 17 is connected, as mentioned earlier, to the transmission terminal 4 of each car, the compressed air in each brake cylinder 15 is fetched into the transmission terminal 4 of each car.

Numeral 18 in the diagram designates a trigger switch which is connected to the transmission center 3. When this trigger switch 18 is turned on, the predetermined trigger signal is applied to the transmission center 3 from outside, and various data transmitted from individual transmission terminals 4 to the transmission center 3 through serial data transmission line 5 are stored in the memory (not shown).

The operation of the measuring sensor inspecting apparatus for train of this invention composed as described above is explained below.

First of all, the initial value is set as follows. Suppose the train to be inspected is fresh after being manufactured or right after periodic inspection with the brake system completely being normal, and with the normal pressure sensors 17 being installed at proper positions in the brake cylinders 15. In this condition, after setting the brake operating units 9 of the cars 1 and 2 at a predetermined state, the pressures in the brake cylinders 15 in the cars 1 and 2 are measured by the individual pressure sensor 17, and the obtained data is transmitted by the trigger switch 18 turned on, into the transmission center 3 to be stored in the memory. The data thus collected and stored in the memory is used as the initial value in the subsequent inspection.

After setting the initial value in this manner, for example after starting the operation of the train, the pressure sensor 17 can be inspected anytime, or periodically or even while the train is running, different from the conventional apparatus which can inspect only when the train is in the shed fully furnished with inspection apparatus installed on the ground.

That is, only when the brake operating unit 9 is put in the same state as when setting the initial condition (not only while parking in the shed, but also no-running time between operations or while stopping at station), by turning on the trigger switch 18, or by preliminarily setting the specified conditions in the transmission center 3, the pressure sensors 17 can be inspected by transmitting the measured results of the pressure sensors 17 in the cars 1 and 2 into the transmission center 3 and comparing them with the initial values stored in the memory.

To inspect by collecting the data of the pressure sensors 17, storing them in the memory and comparing them with the initial value during commercial operation while running the train, it is enough to process the data by setting the load conditions corresponding to the conditions at that time, wtih respect to the data obtained from each pressure sensor 17 at the transmission terminals 4 of the cars 1 and 2. Practically, since the condition when the initial value is obtained is no-load state, to inspect actually, the load conditions of the train at that time are set in the transmission terminals 4 to process the data, so that the measured values by the sensors 17 are obtained in the same no-load state as when setting the initial value, and compare it with the initial values.

Furthermore, in order to inspect while the train is running although it is impossible or unreasonable to set the load condition into the transmission terminals 4, the inspection may be done in the empty car state, while running or during trial run on the rails in the shed or maintenance shop.

Figure 2:
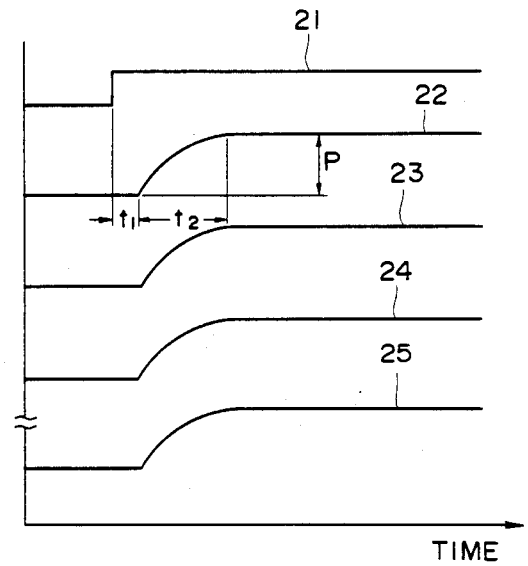
FIGS. 2, 3 and 4 are diagrams showing examples of display or printout into the data output unit of the same apparatus.
Figure 3:
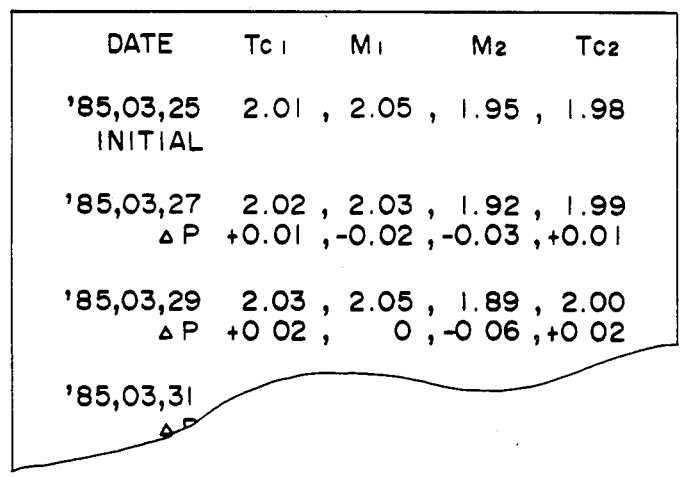
Figure 4:
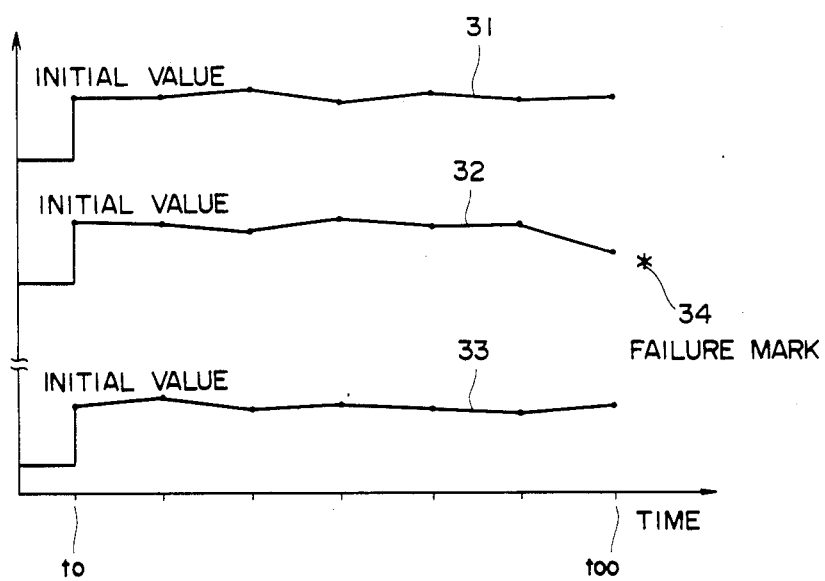

FIGS. 2, 3 and 4 show examples of display on the CRT display 6, or printout to the printer 7 by transmission center 3.

To begin with, FIG. 2 is a graph showing the changes of the pressure in the brake cylinder 15 measured by the pressure sensor 17 in the cars 1 and 2 of a train, plotting the time on the axis of abscissas and the pressure on the axis of ordinates.

In this graph, numeral 21 designates the waveform of brake command signal by the brake command unit 8, and 22 to 25 designate the waveforms of pressure in the brake cylinders 15 in the individual cars measured by the pressure sensors 17. Here, the relation between the waveform 21 of brake command signal and the pressure waveform 22 in the first brake cylinder is as follows. Time $t_1$ after delivering of the brake command signal, braking of the first car begins, and in time $t_2$, th braking force of the car is saturated to reach P.

Therefore, by comparing the time $t_1$ and time $t_2$ for each car, and comparing the braking force P after saturation with the initial value, abnormally in brake system or pressure sensor 17 in each car can be detected.

FIG. 3 shows an example of display or printout, in the form of a table, of the measured value of the brake cylinders 15 by the pressure sensors 17 stored in the memory, having been transmitted from the transmission terminals 4 of the individual cars to the transmission center 3. In this diagram, the date of collecting the data of the pressure sensors 17 is given at the left end, and on its right are sequentially shown the inspection data, for example, of first control trailer ($Tc_1$), first electric motor car ($M_2$), second electric motor car ($M_1$), and final and second control trailer ($Tc_2$). The first line of data is, for example, the data collected right after periodic inspection (or fresh after being manufactured), that is, the initial data, and the second and the subsequent lines represent the data collected at respective points, each shown together with the deviation ΔP from the initial value.

From the table in FIG. 3, therefore, the date of inspection, and the deviation ΔP between the measured value of each pressure sensor 17 and the initial value at each point of inspection are read. As a result, if each deviation ΔP ΔP is larger than a predetermined value, it is considered that the pressure sensor 17 itself, or the brake cylinder or brake operating unit 9 to which the pressure sensor 17 is mounted is abnormal.

FIG. 4 is a graph showing transition of measured values at individual timings of measurement by the pressure sensors 17, plotting the time on the axis of abscissas and the pressure on the axis of ordinates. Here, time $t_0$ on the time axis indicates the data collected in the inspection right after periodic maintenance of the train (or fresh after being manufactured), that is, the initial value. By the fluctuations of the waveforms 31 to 33 of the measured values by each sensors 17 is mounted may be read. Incidentally, if the value of the waveforms 31 to 33 at each time of inspection is remote from the initial value over a certain extent, as indicated by numeral 34, it is also possible to display a predetermined failure mark 34 at a proper position by furnishing the transmission center 3 with such data processing function.

Thus, in this embodiment, it is organized to detect the abnormally of the measuring sensor itself, or the object of measurement by the measuring sensor, by collecting initial data at a certain timing and comparing it with the data collected at the proper time of inspection. And it is also possible to have such organization to store the measurements collected at certain time intervals by the measuring sensors sequentially into the memory, and to detect abnormally of the measuring sensor or the object of the sensor when the deviation between the data at a certain time and the data collected at a succeeding point exceeds a certain limit. In such organization, meanwhile, it is possible to monitor continuously the measuring sensor itself or the object of measurement of the measuring sensor. Furthermore, when such constitution is applied to the measuring sensor of the pressure in the brake cylinder, as in the case of the embodiment above, since the changes in the load condition do not affect directly, dynamic monitoring while the train is running during the commercial operation is possible.

Moreover, in this embodiment, when a brake failure should occur, it is also possible to collect the data necessary for its analysis, such as brake step, speed, main air reservoir pressure and others for a specified period before and after the outbreak of the brake failure, for example, for several seconds, and deliver them into the data output unit to be displayed or printed out. Hitherto, when brake failure occurred, once the running of the train was stopped, and various parts were checked to locate the cause. By applying this invention, by contrast, the cause of brake failure can be located by analyzing the output to the data output unit, and proper countermeasures can be readily taken. As a result, downtime of train operation is notably shortened, and more efficient train operation will be realized.

The above embodiment refers to an example of pressure sensor for measuring the pressure in the brake cylinder, but, not to mention, this invention may be generally applied to other measuring sensors, such as the sensor of air pressure in the bellows of air suspension in running carriage, various sensors other than pressure sensor, and temperature measuring sensor of bearing of the axle, to name only a few.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. Apparatus for inspecting a plurality of measuring sensors each installed in respective cars of a train, comprising:
   a plurality of transmission terminal means, each mounted in one of said cars with an associated one of said sensors, for retrieving an output signal from the associated sensor indicative of a measured value measured by said associated sensor during an inspection interval; and
   transmission center means, responsive to said plurality of transmission terminal means and installed in one of said cars, for receiving the output signals from the plurality of transmission terminal means, for storing data based on said output signals, for processing said data to determine a processing result for each sensor indicative of a deviation between a first value and the measured value, and for generating an output indicative of said processing result.

2. An apparatus as claimed in claim 1, wherein said first value is a preset value.

3. An apparatus as claimed in claim 1, wherein said transmission center means generates a predetermined signal as said output when said deviation exceeds a predetermined value.

4. An apparatus as claimed in claim 1, wherein said first value is a measured value from a preceding inspection interval.

5. An apparatus as claimed in claim 4, wherein said transmission center means generates a predetermined signal as said output when said deviation exceeds a predetermined value.

6. An apparatus as claimed in claim 1, further comprising a CRT display, responsive to said transmission center means.

7. An apparatus as claimed in claim 1, further comprising a printer responsive to said transmission center means.

* * * * *